(12) United States Patent
ElDelgawy et al.

(10) Patent No.: US 12,217,590 B2
(45) Date of Patent: Feb. 4, 2025

(54) SHADOW-BASED FALL DETECTION

(71) Applicant: Alarm.com Incorporated, Tysons, VA (US)

(72) Inventors: Ramy Samir Aziz ElDelgawy, Reston, VA (US); William Wireko Mensah, Fairfax, VA (US); Andrew Or, Sunnyvale, CA (US); Jinfei Yin, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/105,960

(22) Filed: Feb. 6, 2023

(65) Prior Publication Data

US 2023/0252874 A1 Aug. 10, 2023

Related U.S. Application Data

(60) Provisional application No. 63/307,710, filed on Feb. 8, 2022.

(51) Int. Cl.
*G08B 21/02* (2006.01)
*G06V 10/60* (2022.01)
(Continued)

(52) U.S. Cl.
CPC ......... *G08B 21/043* (2013.01); *G06V 10/60* (2022.01); *G06V 10/82* (2022.01); *G08B 21/0476* (2013.01)

(58) Field of Classification Search
USPC ..... 356/124, 124.5, 2, 3, 23, 27, 29, 30, 32, 356/36, 39, 43, 51, 52, 69, 70, 71, 72, 73, 356/73.1, 300, 335, 337, 344, 450, 364, 356/121, 123, 128, 138, 600, 601, 614, 356/625, 388, 399, 402, 426, 429, 432, 356/445, 213, 237.1, 242.1, 243.1, 244, 356/247, 256, 900, 904, 905, 906, 907, 356/908, 911, 912, 916, 917, 918, 922, 356/923, 924, 925, 926, 927, 928, 955, 356/FOR. 000, FOR. 100, FOR. 105, 356/FOR. 106, FOR. 107, FOR. 126, 356/FOR. 127; 340/850, 853.1, 870.01, 340/901, 906, 907, 932.2, 933, 944, 945, 340/984, 988, 425.5, 500, 146.2, 1.1, 340/286.01, 425.1, 407.1, 815.4, 284.1,
(Continued)

(56) References Cited

U.S. PATENT DOCUMENTS 10,769,844 B1 * 9/2020 Rezvani .................. G06T 17/05
10,965,899 B1 * 3/2021 Bart ................... G08B 13/19645
(Continued)

*Primary Examiner* — Daniel Previl
(74) *Attorney, Agent, or Firm* — Fish & Richardson P.C.

(57) ABSTRACT

Methods, systems, and apparatus, including computer programs encoded on computer storage media, for fall detection using data for a person's shadow. One of the methods includes obtaining, from a camera, an image of a portion of a property; determining whether a shadow is likely depicted in the image; in response to determining that a shadow is likely depicted in the image, determining whether the shadow in the image likely represents a potentially falling person; and in response to determining that the shadow in the image likely represents a potentially falling person, performing one or more actions for the potentially falling person.

20 Claims, 3 Drawing Sheets

(51) Int. Cl.
*G06V 10/82* (2022.01)
*G08B 21/04* (2006.01)

(58) Field of Classification Search
USPC ... 340/999, FOR. 000, FOR. 311, FOR. 415, 340/FOR. 465, 573.1, 426.2, 426.21, 507, 340/525, 602, 680, 686.1, 691.1, 693.12
See application file for complete search history.

(56) References Cited

U.S. PATENT DOCUMENTS

| | | | |
|---|---|---|---|
| 2013/0215116 A1* | 8/2013 | Siddique | G06Q 20/40 705/26.7 |
| 2015/0358646 A1* | 12/2015 | Mertens | H04N 5/20 382/166 |
| 2017/0079481 A1* | 3/2017 | Tsibulevskiy | A45D 42/24 |
| 2017/0220887 A1* | 8/2017 | Fathi | G06V 20/64 |
| 2019/0188473 A1* | 6/2019 | Witt | G06F 18/24323 |
| 2023/0364469 A1* | 11/2023 | Discenzo | G16H 50/30 |

* cited by examiner

SHADOW-BASED FALL DETECTION

CROSS-REFERENCE TO RELATED APPLICATION

This application claims the benefit of U.S. Provisional Application No. 63/307,710, filed on Feb. 8, 2022, the contents of which are incorporated by reference herein.

TECHNICAL FIELD

This disclosure relates to fall detection.

BACKGROUND

Falls are a public health concern and cause for institutionalization in the senescent population, for whom they disproportionately affect. Loosely defined as an unintentional and uncontrolled movement towards the ground or lower level, a fall can have debilitating and sometimes fatal consequences. Although falls increase rates of morbidity and mortality, earlier detection and reporting of such events can improve outcomes.

Practical, early detection and reporting of falls has been an elusive goal. Efforts to detect falls have classically employed wearable technologies to capture user input (e.g., panic button press) or to characterize and classify movements and postures. Although these technologies demonstrate reasonable utility in ideal conditions, user non-compliance and fall-related incapacitation reduce general efficacy in application. Furthermore, inability to verify incidence of detected falls (e.g., both true and false) leads to inaccurate fall reporting and undesirable handling of potential fall events.

SUMMARY

Techniques are described for shadow-based fall detection. Fall detection may be performed via wearable devices (e.g. smartwatches) or using video analytics to monitor and track a person's movements (the actual person). These may work well a majority of the time but may be fully dependent on several factors and conditions. For wearable devices, the person may be expected to be wearing the device and the device must be charged. If the device is not on the person or the battery is dead, in the unfortunate event where the person falls, the fall could go undetected and could prove fatal if the person is not attended to immediately—depending on how bad the fall was and/or how old the person is. In the case of video analytics tracking the person's movement, when the person goes outside of the peripheral view of the camera, the person falling may not be detected. There is however a case where video analytics can be used to detect a fall even when the person is not fully in the camera's view and this can be achieved by tracking and analyzing the person's shadow.

A system for shadow-based fall detection may use a camera to record and analyze certain areas of the home and learn about the pattern of shadows within the view of the camera throughout the day since the position of the sun and light rays penetrating the home can impact the angle of shadows of objects within the home (e.g. couch, table etc.). The changes in the position of shadows in the home caused by the position of the sun can be reduced by using a fixed light source such as a lamp. With a lamp in position, the system can train on the position of shadows in the home, in addition to the shadow of people walking inside the home. In the event where a user walks out of the view of the camera but their shadow is still in view, the system can analyze changes in the person's shadow's position to determine whether the person has fallen or not.

In general, one innovative aspect of the subject matter described in this specification can be embodied in methods that include the actions of obtaining, from a camera, an image of a portion of a property; determining whether a shadow is likely depicted in the image; in response to determining that a shadow is likely depicted in the image, determining whether the shadow in the image likely represents a potentially falling person; and in response to determining that the shadow in the image likely represents a potentially falling person, performing one or more actions for the potentially falling person.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination.

In some implementations, determining whether the shadow in the image likely represents a falling person can include: determining a time of day when the image was captured by the camera; determining, using data for the time of day when the image was captured by the camera, whether the shadow in the image likely represents a falling person.

In some implementations, the method can include selecting, using the time of day when the image was captured, a model trained to detect shadows of falling people as the data for the time of day when the image was captured by the camera.

In some implementations, determining whether the shadow in the image likely represents a falling person can include: determining one or more light sources for the image; and determining, using data for the one or more light sources for the image, whether the shadow in the image likely represents a falling person.

In some implementations, determining the one or more light sources for the image can include detecting one or more of a fixed light source or a moveable light source as a source of light for the image.

In some implementations, detecting the one or more of a fixed light source or a moveable light source can include detecting a lamp or a light fixture as a fixed light source for the image.

In some implementations, detecting the one or more of a fixed light source or a moveable light source can include detecting a flashlight, a light on a mobile device, or the sun as a moveable light source for the image.

In some implementations, determining the one or more light sources for the image can include: determining, for one or more potential light sources of multiple potential light sources for an area surrounding content depicted in the image, a status of the corresponding potential light source; and determining, using the statuses of the one or more potential light sources, the one or more light sources for the image.

In some implementations, performing the one or more actions for the potentially falling person can include: determining, using data for the camera, a predicted location of the potentially falling person; and providing, to a computing device, instructions to cause the computing device to present an interface that indicates that the potentially falling person has potentially fallen and the predicted location of the potentially falling person.

In some implementations, the method can include determining whether a number of occupants of the property satisfies an occupancy threshold; in response to determining that the number of occupants of the property satisfies the occupancy threshold, selecting, from a plurality of computing devices at the property, the computing device as a device to provide the instructions to. Providing the instructions can be responsive to selecting the computing device.

In some implementations, the method can include determining, using sensor data for the property, whether a likelihood that an identity of the potentially falling person satisfies a likelihood threshold; in response to determining whether the likelihood that an identity of the potentially falling person satisfies the likelihood threshold, selecting, from a plurality of computing devices at the property, the computing device as a device to provide the instructions to. Providing the instructions can be responsive to selecting the computing device.

The subject matter described in this specification can be implemented in various implementations and may result in one or more of the following advantages. In some implementations, the systems and methods described in this specification can more accurately detect a fall, e.g., using data representing a person's shadow, compared to other systems. In some implementations, the systems and methods described in this specification can more accurately determine a location of a fall, e.g., using data representing a person's shadow, compared to other systems. In some implementations, the systems and methods described in this specification can detect when a person might have fallen without capturing sensor data that directly depicts the person.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Figure 1:
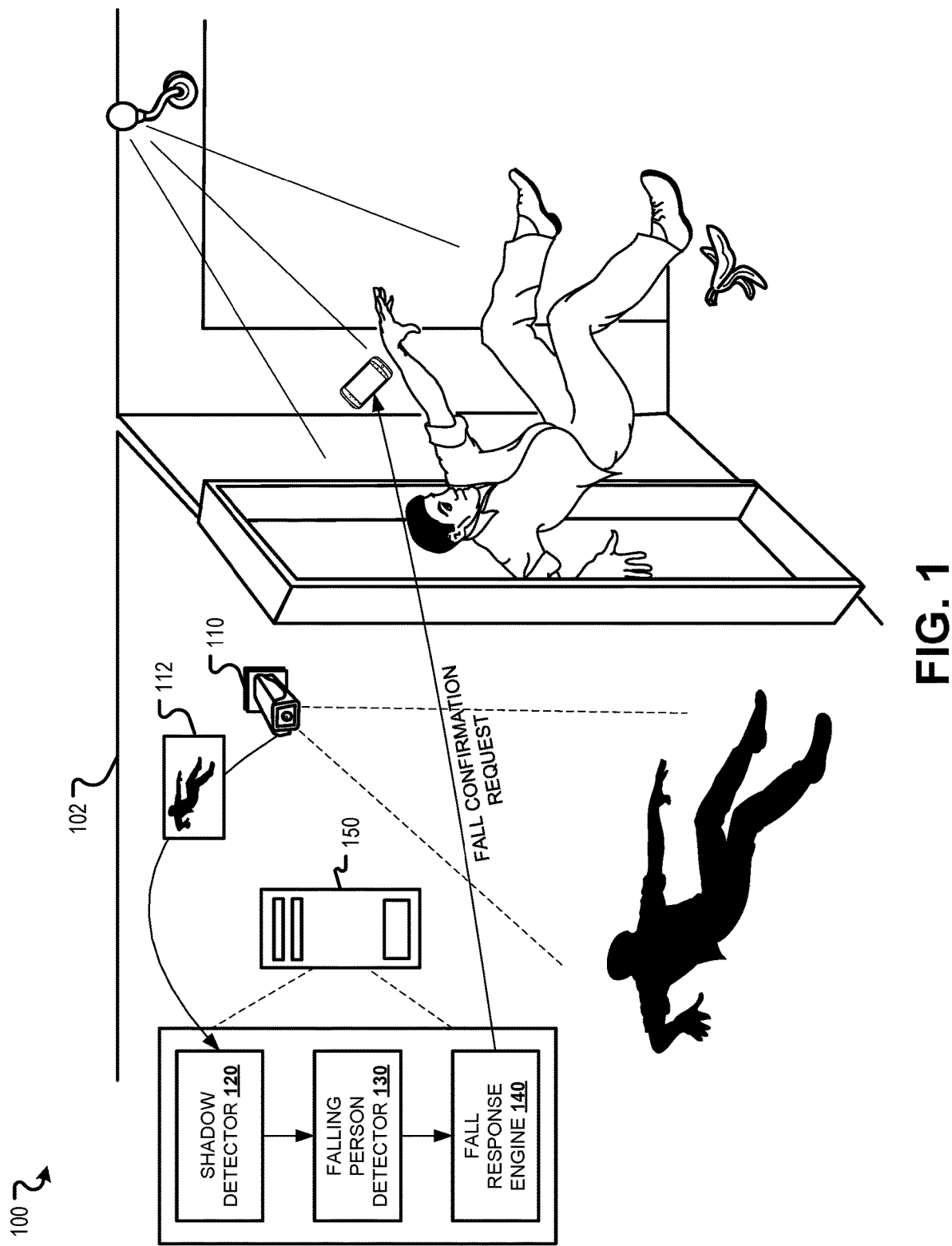
FIG. 1 illustrates an example system for shadow-based fall detection.

FIG. 1 illustrates an example system 100 for shadow-based fall detection. The system 100 may include a camera 110 that captures images in a property 102, a shadow detector 120 that detects shadows depicted in the images captured by the camera 110, a falling person detector 130 that determines a likelihood a person might have potentially fallen based on the shadows detected in the images captured by the camera 110, and a fall response engine 140 that triggers automated actions when the likelihood satisfies a likelihood threshold.

As shown in FIG. 1, the shadow detector 120, falling person detector 130, and fall response engine 140 may be implemented on a control unit 150 located in the property 102 where the control unit 150 is a device that controls various devices within the property 102 like electronic locks, lights, speakers, etc. In another example, the shadow detector 120, falling person detector 130, and the fall response engine 140 may be implemented on a computer, e.g., a server, that is remote from the property 102. In yet another example, the shadow detector 120, the falling person detector 130, and the fall response engine 140 may be implemented on the camera 110. In some cases, the shadow detector 120, the falling person detector 130, and the fall response engine 140 may be implemented on multiple devices. For example, the shadow detector 120 and the falling person detector 130 may be implemented on the camera 110, and the fall response engine 140 may be implemented on a server.

The camera 110 may be a video/photographic camera or other type of optical sensing device configured to capture images. In some implementations, the camera 110 is a CMOS camera sensor (or other CCD sensor) that captures images at various, different resolutions (e.g., low and/or high resolutions). For instance, the CMOS camera sensor may capture 1920×1080 pixels (e.g., Full High Definition resolution) or higher resolutions. The camera 110 also may capture a lower resolution image (e.g., Standard Definition=640×480 pixels). In some implementations, the camera 110 may be a visible light camera. In other implementations, the camera 110 may be an infrared camera. The camera 110 captures images within the property 102 and provides the images to the shadow detector 120. For example, the camera 110 may provide the image 112 of a shadow of a person falling as shown in FIG. 1.

In some implementations, the camera 110 may continuously capture images and provide the images, or at least a subset of the images, to the shadow detector 120. For example, the camera 110 may capture an image every half a second and immediately provide each captured image to the shadow detector 120. In some implementations, the camera 110 may non-continuously capture images and provide the images to the shadow detector 120. For example, the camera 110 may capture images only within time periods pre-defined by a user. In another example, the camera 110 may capture images every half a second only for ten seconds after a door is opened.

The shadow detector 120 may receive the images from the camera and detect shadows depicted within the images. For example, the shadow detector 120 may receive the image 112 and use an edge detection technique to identify boundaries of a large dark shape depicted in the image 112. The shadow detector 120 may detect a shadow upon determining that an object detected in the image 112 satisfies a size and brightness criteria. For example, the shadow detector 120 may determine that an object is shown in at least 5%, 15%, or some other amount of the image and that the average brightness of the object is darker than 20% brightness and, in response, determine the object is likely a shadow. In another example, the shadow detector 120 may determine that an object is not shown in at least 5%, 15%, or some other amount of the image or that the average brightness of the object is not darker than 20% brightness and, in response, determine the object is not likely a shadow.

In some implementations, the shadow detector 120 may ignore background shadows. For example, the shadow detector 120 may determine that a shadow, which may be from a chair, is depicted in a particular region of a threshold amount of images captured by the camera 110 and, in response, determine not to detect for shadows within the particular region. In some examples, the shadow detector 120 may determine that a shadow was likely visible in a particular region of the last five images captured by the camera 110 and, in response, determine not to detect for shadows within the particular region.

In some implementations, the shadow detector 120 may detect overlapping shadows and detect for shadows of falling persons based on the detected overlaps. For example, the shadow detector 120 may determine that a shadow that has newly appeared is likely overlapping with another pre-existing shadow upon detecting that the new shadow is adjacent to a region that included the pre-existing shadow and that a portion of the region that included the pre-existing shadow of the an object, e.g., a couch, is now darker. The shadow detector 120 may then detect the new shadow to include both the portion of the new shadow that doesn't overlap the pre-existing shadow and the region where the shadows overlap, but not include non-overlapping portions of the pre-existing shadow.

The shadow detector 120 may provide an indication of the detected shadow to the falling person detector 130. For example, the shadow detector 120 may provide data representing an outline of the shadow to the falling person detector 130. In some implementations, the shadow detector 120 may emphasize the detected shadow when providing the indication of the detected shadow to the falling person detector 130. For example, the shadow detector 120 may generate a mask, e.g., a black and white image, that shows all pixels of the image from the camera 110 that correspond to the shadow as black and all other pixels of the image from the camera 110 as white.

In some implementations, the shadow detector 120 may correct for distortion of a shadow from a shape of an object that the shadow is cast on. For example, the shadow detector 120 may determine a three dimensional shape of an object that the shadow is cast on and, from the three dimensional shape, generate a predicted corrected shape of the shadow as if the shadow were entirely cast on a flat surface.

The falling person detector 130 may receive the indication of the detected shadow and determine whether the detected shadow likely corresponds to a falling person. For example, the falling person detector 130 may receive the data representing the outline of the shadow shown in the image 122 and determine whether the outline of the shadow likely corresponds to a falling person.

The falling person detector 130 may be a machine-learning based neural network that is trained to receive an input of an image and to output an indication whether the image likely shows a falling person. For example, the falling person detector 130 may be a neural network that is trained with a supervised learning with a training set that includes images of shadows, where each image of a shadow is labeled with a binary value that indicates whether the shadow is of a falling person.

In some implementations, the falling person detector 130 may be trained with a default set of images that are not specific to the particular property 102 and instead show images of shadows of people falling and not falling from other locations. The falling person detector 130 may be trained with images captured by the camera 110 that show shadows of people walking around the property 102 so that the falling person detector 130 learns what shadows of people not falling look like at the property 102.

In some implementations, the falling person detector 130 may use multiple different trained neural networks for falling person detection. For example, the falling person detector 130 may train different neural networks based on subsets of training data that correspond to different times of day, and when determining whether a shadow corresponds to a person falling, only selects the neural network that corresponds to a current time of day and inputs an image of the shadow to the selected neural network and outputs the output from the selected neural network.

In some implementations, the falling person detector 130 may train the neural network based on the occupants of the property 102. For example, the falling person detector 130 may determine heights of each occupant of the property and then train neural networks for each of the occupants, where each of the neural networks are respectively trained based on shadows from people of a height that match the respective height of the occupant.

In some examples, the falling person detector 130 may be trained based on weights of each occupant of the property 102. The falling person detector 130 may then provide images of detected shadows to each of the trained neural network and select the output from the trained neural networks that indicates the highest likelihood of a person falling as output from the falling person detector 130.

In some implementations, the falling person detector 130 may train the neural network based on a location or a status of a light source at the property 102. For example, the falling person detector 130 may receive lamp information from a control unit that indicates which lamps are turned on, and using the lamp information select a particular neural network that is trained on images of shadows cast when those lamps indicated by the lamp information are turned on.

The light source can be fixed or moveable. Some examples of fixed light sources are lamps and light fixtures. Fixed light sources can be light sources that generally remain in substantially the same position while on. Examples of moveable or moving light sources include flash lights, mobile devices with lights turned on, and the sun. Moveable light sources can be light sources that generally move while emitting light.

The falling person detector 130 may output an indication whether a falling person was likely detected. For example, the falling person detector 130 may output an indication that there is a 90% chance that a falling person was detected based on the detected shadow. In another example, the falling person detector 130 may output an indication that there is a 10% chance that a falling person was detected based on the detected shadow. The falling person detector 130 may provide the indication whether a falling person was detected to the fall response engine 140.

The fall response engine 140 may receive an indication whether a falling person was likely detected and trigger performance of an action based on the indication. For example, the fall response engine 140 may receive an indication that there is a 90% chance that a falling person was detected and, in response, transmit a message of "Potential fall detected. Have you fallen?" to a mobile computing device, e.g., smart phone, used by the only occupant detected at the property 102. In some examples, the fall response engine 140 may receive an indication that there is a 90% chance that a falling person was detected but not be able to determine a particular person that might have fallen and, in response, transmit an audio message of "Potential fall detected at front door. Have you fallen?" to a speaker located near the front door and detect with a microphone also at the front door a response of "Yes, please send help."

The fall response engine 140 may trigger an action of alerting emergency personnel based on the indication that a falling person was detected. For example, the fall response engine 140 may determine a response from an occupant was received that explicitly confirms the occupant fell and wants help and, in response, the fall response engine 140 may transmit an alert to emergency personnel. In another example, the fall response engine 140 may determine a response was not received after multiple requests for confirmation, which may indicate an occupant is likely injured and non-responsive, and in response, the fall response engine 140 may transmit an alert to emergency personnel.

In some implementations, where the fall response engine 140 receives a confirmation whether a person did fall, the fall response engine 140 may use the confirmation for further training the falling person detector 130. For example, the fall response engine 140 may receive a confirmation that a person fell and, in response, provide an image of the detected shadow as a positive falling person sample for further training of the falling person detector 130. In another example, the fall response engine 140 may receive a confirmation that a person did not fall and, in response, provide an image of the detected shadow as a negative falling person sample for further training of the falling person detector 130.

In some implementations, if the person who has fallen confirms they need help, the fall response engine 140 may trigger an alert within the property so that if someone else is in the home, they can help the fallen person much quicker than emergency services. For example, the fall response engine 140 may trigger an alert on an alarm panel of the control unit 150. This may be helpful if, for example in a two story house where a person fell downstairs and another person is upstairs, triggering the panel to beep may alert the person upstairs to come down and check on the fallen person.

In some implementations, the system 100 can select a computing device from multiple computing devices at the property to provide an alert to. The system 100 can determine an occupancy of the property 102, a likely identity of the person who potentially fell, or both, to use when selecting the computing device. For instance, when the likely occupancy is one person, e.g., the potentially falling person, the system 100 can select that person's computing device or a computing device that can emit sound throughout the property or the portion of the property in which the potentially falling person is likely located. When the occupancy is more than one, the system 100 can select another person's computing device, e.g., so that the other person can check on the potentially falling person.

In some implementations, the system 100 may determine and provide an alert indicating a location where the fall occurred. For example, shadow-based fall detection may be more accurate than normal video and sound detection when there are visual blocking objects or noise. The system 100 may estimate and alert on a severity of the falling. For example, the system 100 may determine a transition rate of a shadow to tell how quickly the fall happened and use pre-learnt inner house arrangements to check if any dangerous objects near the falling area (which can cause secondary harm by collision or a fall down stairs), and provide an alert indicating a result of the determinations.

Figure 2:
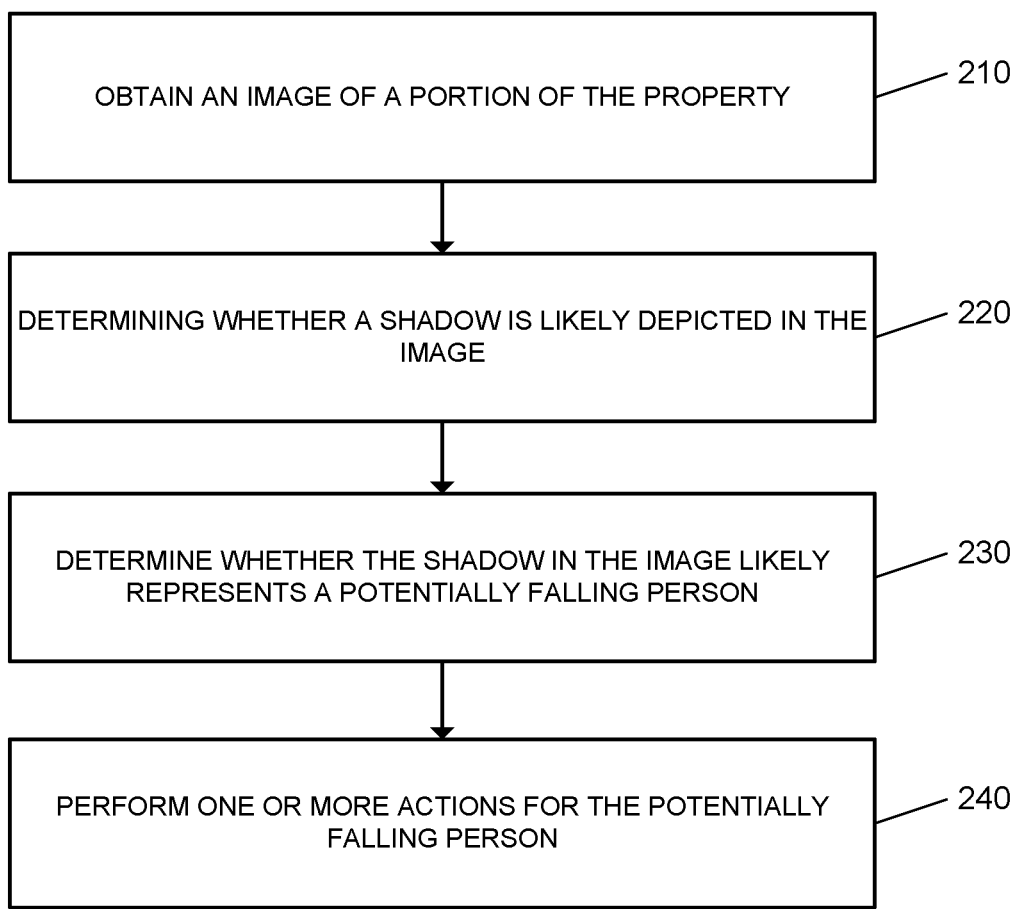
FIG. 2 is a flow diagram of an example process for shadow-based fall detection.

FIG. 2 is a flow diagram of an example process 200 for shadow-based fall detection. The process 200 can be performed by a computing system, e.g., the camera 110, control unit 150, or a server or another computer.

The process 200 includes obtaining an image of a portion of the property (210). For example, the shadow detector 120 may receive, from the camera 110, the image 112 of a floor of the property 102 near a front door.

The process 200 includes determining whether a shadow is likely depicted in the image (220). For example, the shadow detector 120 may detect a shadow in a middle of the image 112. In another example, the shadow detector 120 may determine that no shadows were detected in the image.

The process 200 includes determining whether the shadow in the image likely represents a falling person (230). For example, in response to determining that a shadow is likely depicted in the image, the shadow detector 120 can provide data for the image, the shadow, or both, to the falling person detector 130. The falling person detector 130 may determine that the shadow shown in the image 112 likely represents a falling person. In another example, the falling person detector 130 may determine that a shadow, which may be from a person standing, likely does not represent falling person.

The process 200 includes performing one or more actions for the potentially falling person (240). For instance, in response to determining that the shadow in the image likely representing a falling person, the fall response engine 140 can perform an action. One action can include providing an indication that a person has potentially fallen. For example, the fall response engine 140 may output a message that requests that a person confirm whether the person has fallen.

Figure 3:
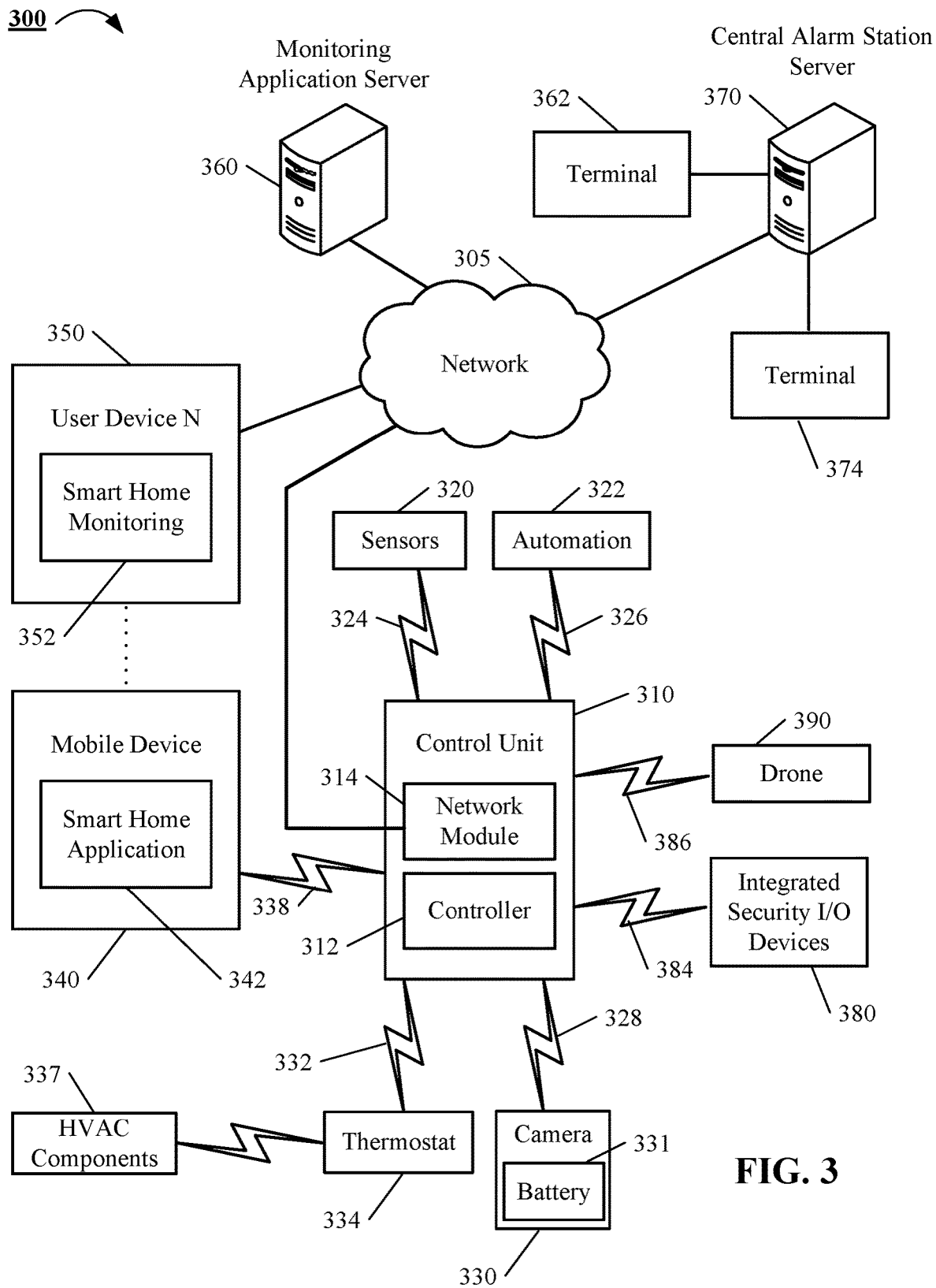
FIG. 3 is a block diagram of an example system for shadow-based fall detection that may utilize one or more various components.

FIG. 3 is a block diagram of an example system 300 for shadow-based fall detection that may utilize one or more various components. The electronic system 300 includes a network 305, a control unit 310, one or more user devices 340 and 350, a monitoring application server 360, and a central alarm station server 370. In some examples, the network 305 facilitates communications between the control unit 310, the one or more user devices 340 and 350, the monitoring application server 360, and the central alarm station server 370. The control unit 310 may be the control unit 150, the user device 340 may be the mobile computing device that receives the message of "Potential fall detected. Have you fallen?"

The network 305 is configured to enable exchange of electronic communications between devices connected to the network 305. For example, the network 305 may be configured to enable exchange of electronic communications between the control unit 310, the one or more user devices 340 and 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voiceband modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The control unit 310 communicates with the module 322 and the camera 330 to perform monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol. Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the control unit 310. For instance, the module 322 may cause a lighting system to illuminate an area to provide a better image of the area when captured by a camera 330. The camera 330 can include one or more batteries 331 that require charging. A drone 390 can be used to survey the electronic system 300. In particular, the drone 390 can capture images of each item found in the electronic system 300 and provide images to the control unit 310 for further processing. Alternatively, the drone 390 can process the images to determine an identification of the items found in the electronic system 300.

The camera 330 may be a video/photographic camera or other type of optical sensing device configured to capture images. For instance, the camera 330 may be configured to capture images of an area within a building or within a residential property 102 monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the control unit 310 and the camera 330 receives commands related to operation from the monitoring application server 360.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a property and/or environmental data at a property, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy-monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls.

A module 337 is connected to one or more components of an HVAC system associated with a property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy-monitoring information and the state of the HVAC system components to the thermostat 334 and can control the one or more components of the HVAC system based on commands received from the thermostat 334.

In some examples, the system 300 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 300 for use in appropriate circumstances. For instance, a robotic vacuum cleaner device may be associated with the monitoring system 300 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 310, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 310. Other types of short-range wireless communication protocols, such as Bluetooth, Bluetooth LE, Zwave, Zigbee, etc., may be used to allow the robotic devices to communicate with other devices in the property. In some implementations, the robotic devices 390 may communicate with each other or with other devices of the system 300 through the network 305.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 300. For instance, after completion of a monitoring operation or upon instruction by the control unit 310, the robotic devices may be configured to automatically fly to and land on one of the charging stations. In this regard, the robotic devices may automatically maintain a fully charged battery in a state in which the robotic devices are ready for use by the monitoring system 300.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices. Additionally, the one or more control units 310 may receive one or more sensor data from the sensors 320 and determine whether to provide an alert to the one or more integrated security input/output devices 380.

The sensors 320, the module 322, the camera 330, the thermostat 334, drone 390, and the integrated security devices 380 communicate with the controller 312 over communication links 324, 326, 328, 332, 384, and 386. The communication links 324, 326, 328, 332, 384, and 386 may be a wired or wireless data pathway configured to transmit signals from the sensors 320, the module 322, the camera 330, the thermostat 334, the drone 390, and the integrated security devices 380 to the controller 312. The sensors 320, the module 322, the camera 330, the thermostat 334, the drone 390, and the integrated security devices 380 may continuously transmit sensed values to the controller 312, periodically transmit sensed values to the controller 312, or transmit sensed values to the controller 312 in response to a change in a sensed value. In some implementations, the drone 390 can communicate with the monitoring application server 360 over network 305. The drone 390 can connect and communicate with the monitoring application server 360 using a Wi-Fi or a cellular connection.

The communication links 324, 326, 328, 332, 384, and 386 may include a local network. The sensors 320, the module 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 3 (CAT6) wired Ethernet network. The local network may be a mesh network constructed based on the devices connected to the mesh network.

The monitoring application server 360 is an electronic device configured to provide monitoring services by exchanging electronic communications with the control unit 310, the one or more user devices 340 and 350, and the central alarm station server 370 over the network 305. For example, the monitoring application server 360 may be configured to monitor events (e.g., alarm events) generated by the control unit 310. In this example, the monitoring application server 360 may exchange electronic communications with the network module 314 included in the control unit 310 to receive information regarding events (e.g., alerts) detected by the control unit server 104a. The monitoring application server 360 also may receive information regarding events (e.g., alerts) from the one or more user devices 340 and 350.

In some examples, the monitoring application server 360 may route alert data received from the network module 314 or the one or more user devices 340 and 350 to the central alarm station server 370. For example, the monitoring application server 360 may transmit the alert data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the control unit 310 or the one or more user devices 340 and 350.

The central alarm station server 370 is an electronic device configured to provide alarm monitoring service by exchanging communications with the control unit 310, the one or more mobile devices 340 and 350, and the monitoring application server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring application server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 6 illustrates two terminals for brevity, actual implementations may include more (and, perhaps, many more) terminals.

The one or more user devices 340 and 350 are devices that host and display user interfaces. For instance, the user device 340 is a mobile device that hosts one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the control unit 310 over the network 305. The user device 350 may be configured to display a smart home user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 6 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Zwave, Zigbee, HomePlug (ethernet over powerline), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring application server 360 may relay data received from the control unit 310 to the one or more user devices 340 and 350 through the network 305. In this regard, the monitoring application server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring application server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring application server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 only includes the one or more user devices 340 and 350, the sensors 320, the module 322, the camera 330, and the robotic devices. The one or more user devices 340 and 350 receive data directly from the sensors 320, the module 322, the camera 330, and the robotic devices and sends data directly to the sensors 320, the module 322, the camera 330, and the robotic devices. The one or more user devices 340, 350 provide the appropriate interfaces/processing to provide visual surveillance and reporting.

In other implementations, the system 300 further includes network 305 and the sensors 320, the module 322, the camera 330, the thermostat 334, and the robotic devices are configured to communicate sensor and image data to the one or more user devices 340 and 350 over network 305 (e.g., the Internet, cellular network, etc.). In yet another implementation, the sensors 320, the module 322, the camera 330, the thermostat 334, and the robotic devices (or a component, such as a bridge/router) are intelligent enough to change the communication pathway from a direct local pathway when the one or more user devices 340 and 350 are in close physical proximity to the sensors 320, the module 322, the camera 330, the thermostat 334, and the robotic devices to a pathway over network 305 when the one or more user devices 340 and 350 are farther from the sensors 320, the module 322, the camera 330, the thermostat 334, and the robotic devices. In some examples, the system leverages GPS information from the one or more user devices 340 and 350 to determine whether the one or more user devices 340 and 350 are close enough to the sensors 320, the module 322, the camera 330, the thermostat 334, and the robotic devices to use the direct local pathway or whether the one or more user devices 340 and 350 are far enough from the sensors 320, the module 322, the camera 330, the thermostat 334, and the robotic devices that the pathway over network 305 is required. In other examples, the system leverages status communications (e.g., pinging) between the one or more user devices 340 and 350 and the sensors 320, the module 322, the camera 330, the thermostat 334, and the robotic devices to determine whether communication using the direct local pathway is possible. If communication using the direct local pathway is possible, the one or more user devices 340 and 350 communicate with the sensors 320, the module 322, the camera 330, the thermostat 334, and the robotic devices using the direct local pathway. If communication using the direct local pathway is not possible, the one or more user devices 340 and 350 communicate with the sensors 320, the module 322, the camera 330, the thermostat 334, and the robotic devices using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
   obtaining, from a camera, an image of a portion of a property;
   determining whether a shadow is likely depicted in the image;
   in response to determining that a shadow is likely depicted in the image, determining whether the shadow in the image likely represents a potentially falling person; and
   in response to determining that the shadow in the image likely represents a potentially falling person, performing one or more actions for the potentially falling person.

2. The method of claim 1, wherein determining whether the shadow in the image likely represents a falling person comprises:
   determining a time of day when the image was captured by the camera; and
   determining, using data for the time of day when the image was captured by the camera, whether the shadow in the image likely represents a falling person.

3. The method of claim 2, comprising selecting, using the time of day when the image was captured, a model trained to detect shadows of falling people as the data for the time of day when the image was captured by the camera.

4. The method of claim 1, wherein determining whether the shadow in the image likely represents a falling person comprises:
   determining one or more light sources for the image; and
   determining, using data for the one or more light sources for the image, whether the shadow in the image likely represents a falling person.

5. The method of claim 4, wherein determining the one or more light sources for the image comprises:
   determining, for one or more potential light sources of multiple potential light sources for an area surrounding content depicted in the image, a status of the corresponding potential light source; and
   determining, using the statuses of the one or more potential light sources, the one or more light sources for the image.

6. The method of claim 4, wherein determining the one or more light sources for the image comprises detecting one or more of a fixed light source or a moveable light source as a source of light for the image.

7. The method of claim 6, wherein detecting the one or more of a fixed light source or a moveable light source comprises detecting a lamp or a light fixture as a fixed light source for the image.

8. The method of claim 6, wherein detecting the one or more of a fixed light source or a moveable light source comprises detecting a flashlight, a light on a mobile device, or the sun as a moveable light source for the image.

9. The method of claim 1, wherein performing the one or more actions for the potentially falling person comprises:
   determining, using data for the camera, a predicted location of the potentially falling person; and
   providing, to a computing device, instructions to cause the computing device to present an interface that indicates that the potentially falling person has potentially fallen and the predicted location of the potentially falling person.

10. The method of claim 9, comprising:
    determining whether a number of occupants of the property satisfies an occupancy threshold; and
    in response to determining that the number of occupants of the property satisfies the occupancy threshold, selecting, from a plurality of computing devices at the property, the computing device as a device to provide the instructions to, wherein providing the instructions is responsive to selecting the computing device.

11. The method of claim 9, comprising:
    determining, using sensor data for the property, whether a likelihood that an identity of the potentially falling person satisfies a likelihood threshold; and
    in response to determining whether the likelihood that an identity of the potentially falling person satisfies the likelihood threshold, selecting, from a plurality of computing devices at the property, the computing device as a device to provide the instructions to, wherein providing the instructions is responsive to selecting the computing device.

12. A system comprising one or more computers and one or more storage devices on which are stored instructions that are operable, when executed by the one or more computers, to cause the one or more computers to perform operations comprising:
    obtaining, from a camera, an image of a portion of a property;

determining whether a shadow is likely depicted in the image;

in response to determining that a shadow is likely depicted in the image, determining whether the shadow in the image likely represents a potentially falling person; and in response to determining that the shadow in the image likely represents a potentially falling person, performing one or more actions for the potentially falling person.

13. The system of claim 12, wherein determining whether the shadow in the image likely represents a falling person comprises:

determining a time of day when the image was captured by the camera; and determining, using data for the time of day when the image was captured by the camera, whether the shadow in the image likely represents a falling person.

14. The system of claim 13, the operations comprising selecting, using the time of day when the image was captured, a model trained to detect shadows of falling people as the data for the time of day when the image was captured by the camera.

15. The system of claim 12, wherein determining whether the shadow in the image likely represents a falling person comprises:

determining one or more light sources for the image; and determining, using data for the one or more light sources for the image, whether the shadow in the image likely represents a falling person.

16. The system of claim 15, wherein determining the one or more light sources for the image comprises:

determining, for one or more potential light sources of multiple potential light sources for an area surrounding content depicted in the image, a status of the corresponding potential light source; and determining, using the statuses of the one or more potential light sources, the one or more light sources for the image.

17. The system of claim 15, wherein determining the one or more light sources for the image comprises detecting one or more of a fixed light source or a moveable light source as a source of light for the image.

18. The system of claim 17, wherein detecting the one or more of a fixed light source or a moveable light source comprises detecting a lamp or a light fixture as a fixed light source for the image.

19. The system of claim 17, wherein detecting the one or more of a fixed light source or a moveable light source comprises detecting a flashlight, a light on a mobile device, or the sun as a moveable light source for the image.

20. One or more non-transitory computer storage media encoded with instructions that, when executed by one or more computers, cause the one or more computers to perform operations comprising:

obtaining, from a camera, an image of a portion of a property;

determining whether a first likelihood that a shadow is depicted in the image satisfies a first likelihood threshold;

in response to determining that the first likelihood that a shadow is depicted in the image satisfies the first likelihood threshold, determining whether a second likelihood that the shadow in the image represents a potentially falling person satisfies a second likelihood threshold; and in response to determining that the second likelihood that the shadow in the image represents a potentially falling person satisfies the second likelihood threshold, performing one or more actions for the potentially falling person.

* * * * *